3,077,380
PREPARATION OF SAPPHIRE FIBERS
Eugene Wainer, Cleveland Heights, and Andrew Cunningham, Cleveland, Ohio, assignors to Horizons Incorporated, a corporation of New Jersey
No Drawing. Filed July 24, 1959, Ser. No. 829,219
5 Claims. (Cl. 23—142)

This invention relates to the preparation of alpha alumina in the form of extremely fine fibers possessed of appreciable strength at high temperatures. More particularly, it relates to a method for producing translucent wool like fibers of alpha alumina possessed of substantially uniform diameter over the length of each fiber and having tensile strengths in excess of 1,000,000 p.s.i. for fibers approximately 0.02 to 0.04 mm. in diameter.

Fibrous alumina having tensile strengths in the range of one million to three million p.s.i. and remaining mechanically stable at temperature as high as 3000° F. would be useful as a reinforcing material in the preparation of improved components for rockets and missiles.

By the procedure about to be described a method has been devised for producing high strength alumina fibers controllably and efficiently and at relatively high rates of production.

Briefly in accordance with the invention, relatively pure hydrogen gas containing minute but significant amounts of water vapor is passed over a surface of molten aluminum in a system in which vaporous products evolved from the melt are permitted to contact a surface formed of at least one oxide selected from the group of oxides having a heat of formation less than the heat of formation of $Al_2O_3$ at the prevailing temperature and hence capable of being reduced by metallic aluminum in the system. Said low heat of formation oxide may be part of a system which may or may not also contain $Al_2O_3$ in mechanical mixture or chemically combined. Further the system and its components must be maintained at carefully controlled temperatures.

When molten aluminum is brought into contact with trace amounts of oxygen, either free or combined, at temperatures of 1200° F. and above, either of two gaseous oxides may form: AlO or $Al_2O$. Regardless of which oxide forms, the condensation of this oxide on a suitable surface appears to result in the disproportionation of the oxide and formation of alpha alumina plus aluminum metal. With a suitable combination of environments, alumina whiskers of the desired properties have been found to form.

For the growth of alumina fibers with the desired properties it is necessary that the temperature of the melt be at least 1200° C. and preferably for optimum growth, between 1370° C. and 1400° C. It has been found that the rate of whisker formation may be substantially increased by suitably altering the composition of the melt. Thus the addition of about 20 mol percent of titanium to a melt of pure aluminum was found to speed up the formation of alumina fibers by a factor of about 8 as compared with unalloyed aluminum. With an increase in temperature to 1510° C. the rate was increased 17-fold as compared with unalloyed aluminum at 1370° C. Other elements which may be effectively added in like amounts to the aluminum included zirconium, niobium, tantalum and silicon.

The composition of the atmosphere is also critical. Specifically it has been found that the atmosphere brought into contact with the melt of aluminum or aluminum alloy must consist of hydrogen containing between about 3 and 5 parts water vapor per million parts of hydrogen (by weight), or expressed in somewhat different terms it has been found that hydrogen dried to a dewpoint of at least minus 30° C. and preferably to a dewpoint of between minus 50° C. and minus 68° C. should constitute the atmosphere in contact with the melt. In actual operation it is readily apparent that the amount of oxygen available in the hydrogen dried to the extent indicated is only an infinitesimal amount of the oxygen eventually present in the fibrous product and that such product was not formed, therefore, entirely as a result of a reaction between the melt and the water vapor, e.g.

$$2Al + 3H_2O \rightarrow Al_2O_3 + 3H_2$$

While we do not wish to be bound by any specific theory it appears that the required oxygen is obtained from refractory surfaces in the apparatus and more particularly from refractory surfaces formed of one or more oxides, at least one of which possesses a heat of formation significantly lower than the heat of formation of alumina ($Al_2O_3$).

The mechanism of the desirable type of fiber growth appears to be the following: Pure aluminum metal is heated to a temperature at which it exhibits a significant vapor pressure, and it appears that the vapor pressure is between 1 and 10 millimeters. According to the data available in the literature, the vapor pressure of aluminum over molten aluminum is 1 millimeter at 1284° C. and is 10 millimeters at 1487° C. Therefore at the temperature of optimum formation of fibers for pure aluminum, namely, 1370° C., the vapor pressure of aluminum over molten aluminum appears to be approximately 7 millimeters. Now, the first stage of the reaction apparently proceeds as a result of pure hydrogen containing a few parts per million of water vapor coming in contact with the aluminum metal in vapor form, and as a result, gaseous $Al_2O$ is formed. In view of the optimum concentration of water vapor in the hydrogen, the aluminum metal in vapor form would appear to be in excess of the concentration of $Al_2O$ and this would appear to be a requirement in order to stabilize the $Al_2O$ oxide composition in question. A mixture of gaseous aluminum and gaseous $Al_2O$ then contacts an oxide surface, whose required nature will be defined later, and a reaction immediately takes place on this oxide surface which may or may not require condensation to a liquid form. The vaporized aluminum metal in combination with $Al_2O$ vapor decomposes the oxide surface and forms a reactive nucleus for the continued formation of sapphire. As the result of the disproportionation reaction given previously, a product of this reaction is, significantly, aluminum metal in addition to the sapphire.

Unless this reducible refractory oxide is present, the desired whisker growth and formation of aluminum oxide does not take place. Oxides which are suitable for the purpose are those whose heats of formation are significantly less than that required to form aluminum oxide. It is of interest to note that aluminum oxide itself will be effective, providing it is contaminated with other oxides either in the form of a compound or in solution which will reduce the heat of formation of the composite. Thus, alumina containing small amounts of silica; silica; combinations of alumina, zirconia, and silica; combinations of alumina, titania, and silica; and the like will be effective. Thus, an alumina boat containing a minor contamination of silica will be quite effective in the formation of fibers whereas a very pure alumina boat will exhibit a lesser degree of effectiveness, because of the highly reduced content of silica, and a porcelain boat which has a high content of silica, thus reducing the overall heat of formation of the alumina-silica compound, will be still more effective.

To repeat, the oxygen needed to form the sapphire whiskers comes from two sources. The water in the hydrogen is needed to form $Al_2O$ or other Al—O vapor and the oxygen in a refractory oxide ambient provides the remainder of the oxygen through a reaction involving decomposition of such refractory oxide and vaporized aluminum at a site where $Al_2O$ is available. The ingredients necessary to produce the aluminum oxide come from a vapor phase reaction, and the control reaction to produce whiskers is due to the reaction between a solid and a gas. Whether or not a liquid phase forms initially as a result of such reaction is not clear, but there is evidence to indicate that this may be the case. The nature of the refractory surface constitutes a control mechanism, in that the concentration of oxygen needed for the formation of the whiskers due to the reaction between aluminum vapor and the oxide surface is maintained at a rate necessary for the formation.

Further we have found that well formed refractories are necessary. These may be finely divided if desired only if they have been previously calcined so as to produce a very tight surface on the particle. By this means, the rate of the reaction is maintained at a proper level so that the concentration of oxygen as a result of the reaction between aluminum metal and the refractory surface does not proceed at too high a rate. If the particle is porous or too finely divided the rate of reaction of the Al metal with the oxide is so high that the desired conditions for good whisker growth are not obtained.

It should be noted that either of two types of fibers may be obtained according to the conditions attained in the system. These may be either coarse, brittle whiskers or fine strong and relatively ductile wool-like strands.

Typical dimensions of the two types of fibers are tabulated below.

Table I

|  | Diameter | Length |
|---|---|---|
| Wool | 0.1–7 microns (3–6 average) | Up to 3" (¼–½" avg.). |
| Whisker | 80 microns or more | ¼–¾". |

Both wool and whisker types of fiber growth have been observed. The first fibers deposited by condensation of the aluminum oxide smoke under the preferred conditions of operation described above, are round in cross section and have diameters ranging from less than one micron to six microns. The appearance of the fine diameter product first formed is very similar to that of a carded wool or short fiber cotton. These fibers tend to be short lengths although occasionally a long fiber, several inches in length occurs.

The other type of fiber observed has been a much larger brittle form, seen usually as needles growing out from the melt and the melt container. These coarse brittle fibers appear to be formed from the finer, wool-like fibers when those fibers are subjected to temperatures in excess of these defined below, particularly for extended intervals of time, or where the desired refractory source of oxygen is not properly available.

The formation of the undesired coarse brittle fibers may be the result of failure to operate within the above described critical limits. For example if the melt temperature is excessive, e.g. 1510° C. for pure aluminum, the fibers formed were found to consist almost entirely of coarse brittle whiskers, after prolonged growing periods even when using hydrogen dried to a dewpoint of about minus 65° C.

Similarly failure to provide the proper atmosphere was equally inimical to the growth of the proper type of fibers. Thus the fiber growth appears to take place only in hydrogen. Attempts to use nitrogen or argon as the gas for carrying controlled amounts of oxygen or water vapor into contact with the aluminum were unsuccessful. Also the use of hydrogen dried to a dewpoint of minus 30° C. or higher resulted in a pronounced accentuation of the coarse growth, leading usually to the growth of a very large hexagonal crystal of aluminum oxide in preference to the above described fibers or whiskers.

Finally it was found that if instead of a refractory oxide, a stainless steel or Inconel tube was used in place of the porcelain boat or other refractory tube as described above, the rate of fiber growth was diminished sharply and an undesired type of whisker was formed. If now the metal boat containing the aluminum melt was inserted in a sleeve of porcelain and this assembly was reinserted into a metal tube, the original rate of fiber growth was experienced.

One manner of achieving the desired formation of fine fibers of alpha alumina will now be described in detail, by way of illustration.

A modified Globar heated furnace with a tube 2 inches in diameter by 36 inches length was employed. Furnace temperature was controlled by Chromel-Alumel thermocouples. The furnace was provided with means to admit hydrogen and to discharge spent gases as well as means to admit a porcelain boat containing aluminum into said furnace, preferably disposed in a refractory tube.

The hydrogen employed was passed through a purification train consisting of a Deoxo purifier, bubbler, dust trap, cold trap, $P_2O_5$ tower, $MgClO_4$ tower, and a second $P_2O_5$ tower. Dewpoint of the hydrogen introduced into the furnace could be varied from about minus 35° C. at the tank to less than minus 90° C. by bypassing one or more elements in the purification train.

Runs were made with the temperature varied between 1090° C. and 1510° C. whereby it was found that with aluminum a temperature of at least 1200° C. was necessary and a temperature of between 1320° C. and about 1400 C. were particularly effective. Other runs made with various amounts of Ti or Zr added to the melt indicated that melts with between 10 mol percent and 25 mol percent of Ti or Zr were particularly useful in speeding up fiber formation at somewhat higher temperatures.

Typical properties of fibers obtained are listed by way of example as follows:

Tensile strengths of 1 to $3 \times 10^6$ p.s.i.
Fibers may be bent 360°.

Having now described the invention in accordance with the patent statutes, we claim:

1. The process of forming fibrous anhydrous, alpha alumina which consists in heating a metal consisting essentially of aluminum to melt said metal; contacting the melt with gas consisting essentially of hydrogen gas dried to a dew point between minus 30° C. and minus 90° C., while said melt is maintained at a temperature of at least 1370° C. to below about 1510° C.; maintaining a condensing surface in physical contact with the vapor phase above the melt, said surface containing at least one refractory oxide having a heat of formation smaller than the heat of formation of aluminum oxide, at the prevailing temperature; and forming said fibrous alumina on said condensing surface.

2. The process of claim 1 wherein the hydrogen contains between about 3 and about 5 parts by weight of water vapor per million parts of hydrogen by weight.

3. The process of claim 1 wherein the melt is substantially pure aluminum and the temperature is about 1370° C.

4. The process of claim 1 wherein the melt is aluminum containing up to about 25 mol percent of an element from the group consisting of Ti, Zr, Nb, Ta and Si.

5. The process of claim 1 wherein the refractory oxide is selected from the group consisting of silica, titania, zirconia and impure alumina contaminated by at least one of said oxides, and mixtures of said oxides with alumina.

(References on following page)

References Cited in the file of this patent

UNITED STATES PATENTS

| | | |
|---|---|---|
| 2,758,011 | Bloch | Aug. 7, 1956 |
| 2,867,505 | Bloch | Jan. 6, 1959 |
| 2,915,475 | Bugosh | Dec. 1, 1959 |

FOREIGN PATENTS

| | | |
|---|---|---|
| 165,052 | Great Britain | Dec. 28, 1921 |

OTHER REFERENCES

Webb, W. W., et al. in "Journal of Applied Physics," vol. 28, No. 12, December 1957, pages 1449–1454.

Journal of American Chemical Society, "The . . . System," L. Brewer et al., vol. 73, No. 11, 1951, pages 5308–5314.

Journal of American Chemical Society, "Formation . . . Suboxides: $Al_2O$ and $AlO$," M. Hoch et al., vol. 76, No. 9, 1954, pages 2560–2561.

Doklady Akad. Nauk S.S.S.R., "Investigation . . . Temperatures," M. S. Beletski et al., vol. 80, No. 5, 1951, pages 751–754.